April 18, 1950 G. C. EVANS 2,504,118
UNDERWATER SONIC APPARATUS
Filed Aug. 2, 1945 4 Sheets-Sheet 1

INVENTOR.
George C. Evans
BY
Ralph L Chappell
ATTORNEY

April 18, 1950     G. C. EVANS     2,504,118
UNDERWATER SONIC APPARATUS
Filed Aug. 2, 1945     4 Sheets-Sheet 2
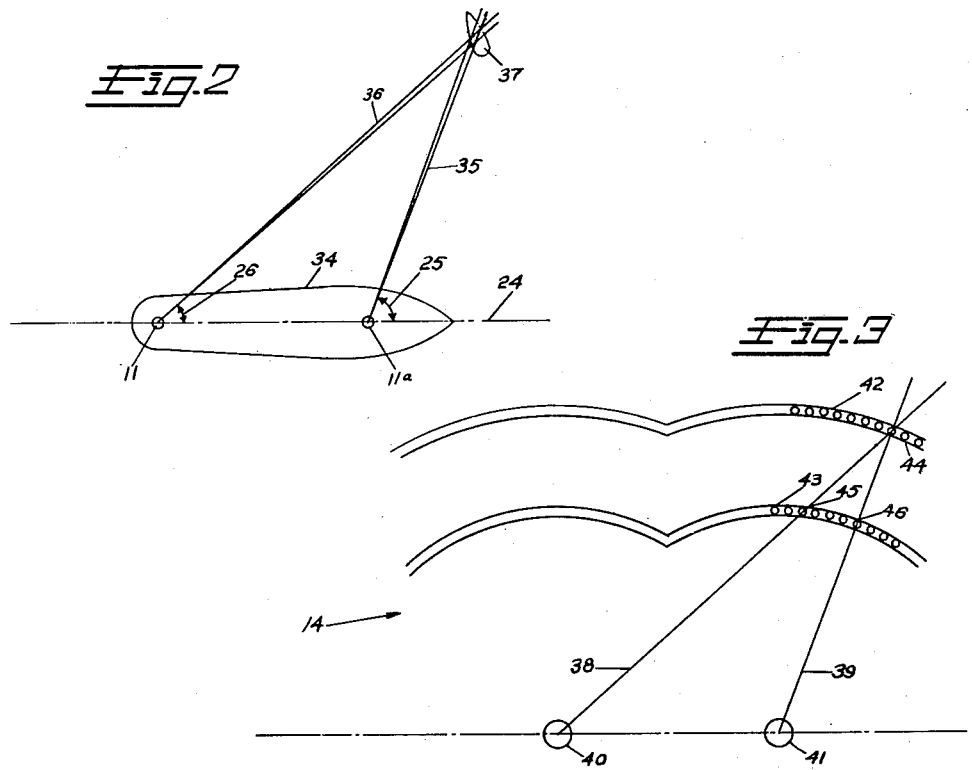
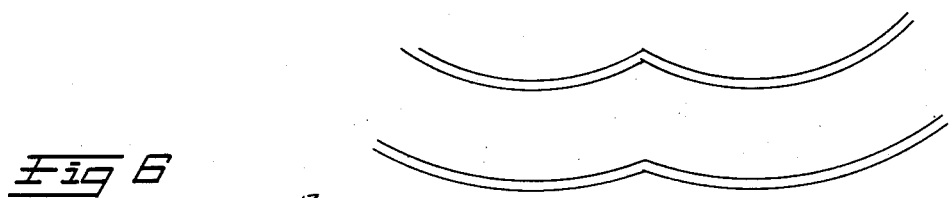
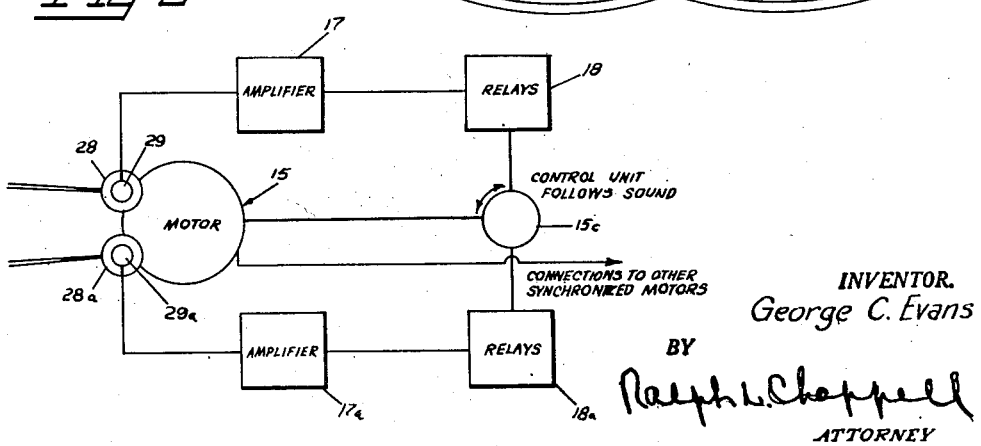
INVENTOR.
George C. Evans
BY
Ralph L. Chappell
ATTORNEY April 18, 1950     G. C. EVANS     2,504,118
UNDERWATER SONIC APPARATUS
Filed Aug. 2, 1945     4 Sheets-Sheet 3

INVENTOR.
George C. Evans
BY
Ralph V. Chappell
ATTORNEY

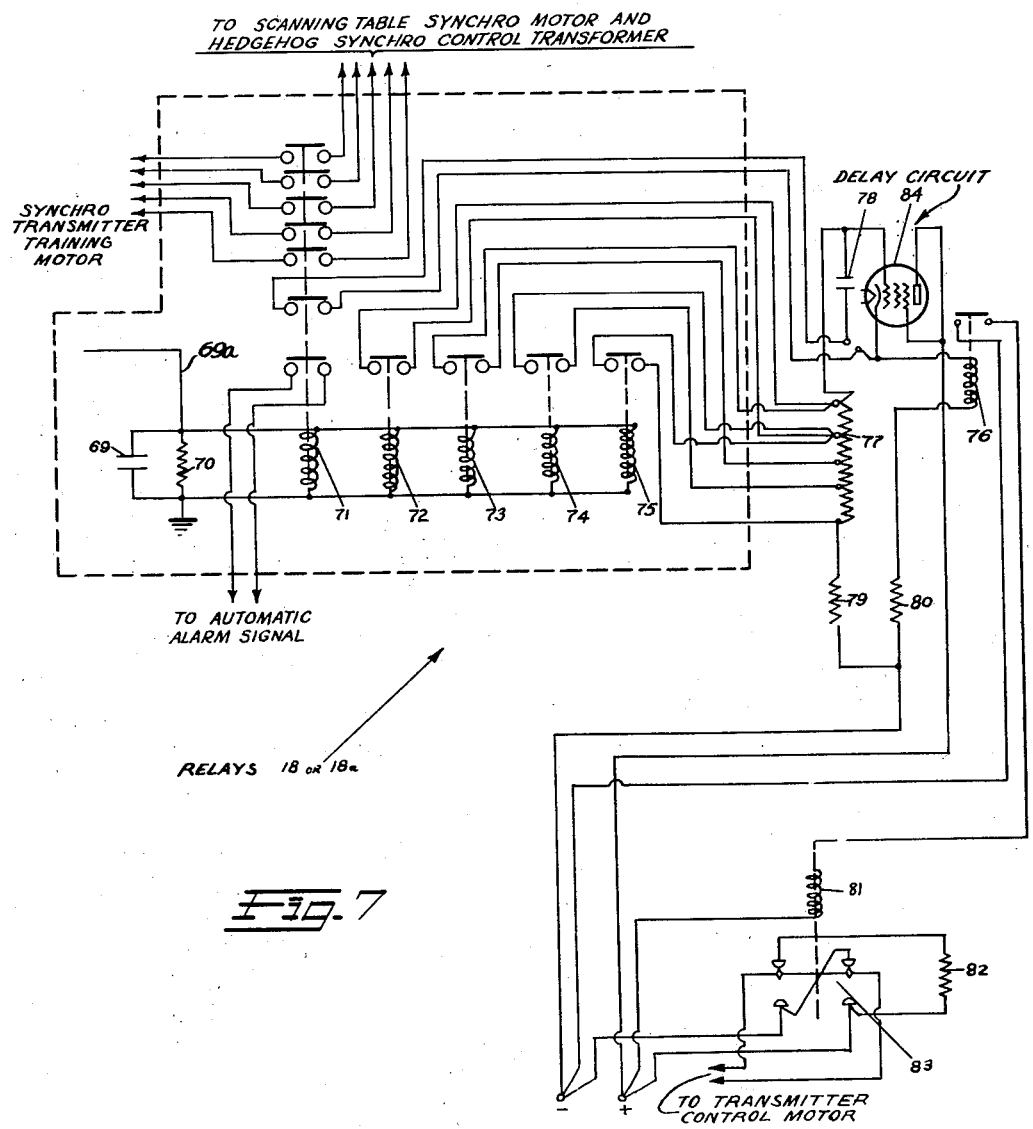

//Patented Apr. 18, 1950

2,504,118

UNITED STATES PATENT OFFICE 2,504,118

UNDERWATER SONIC APPARATUS

George C. Evans, United States Navy

Application August 2, 1945, Serial No. 608,541

13 Claims. (Cl. 89—41)

(Granted under the act of March 3, 1883, as amended April 30, 1928; 370 O. G. 757)

This invention relates in general to detection of underwater objects and in particular to a process and apparatus for the detection and location of such objects.

It is an object of this invention to provide a process for detecting and locating underwater objects by means of sonic waves and using the principle of triangulation.

It is a further object to provide apparatus for detecting and locating underwater objects by means of sonic waves.

It is an additional object to provide an automatic process for detecting underwater objects by means of reflected high-frequency sonic waves, locating the objects by triangulation and destroying the objects.

It is an additional object to provide automatic apparatus for detecting underwater objects by means of reflected high-frequency sonic waves locating the objects by triangulation and destroying said objects.

Further objects and advantages of this invention as well as its construction, arrangement and operation, will be apparent from the following description and claims in connection with the accompanying drawings, in which Fig. 1 is a diagram showing the interrelationship among various parts of the apparatus.

Fig. 2 is a diagram showing the arrangement of high-frequency sound transmitters in a ship equipped with this apparatus, and showing said transmitters trained on an underwater object.

Fig. 3 is a diagram of a scanning table designed to indicate the location of a detected object.

Fig. 6 is a diagram according to one embodiment of this invention whereby a narrow-beam sonic transmitter is kept constantly trained on a detected underwater object.

Fig. 7 is a wiring diagram showing the operation of a controlling unit according to one embodiment of this invention.

Figure 1:
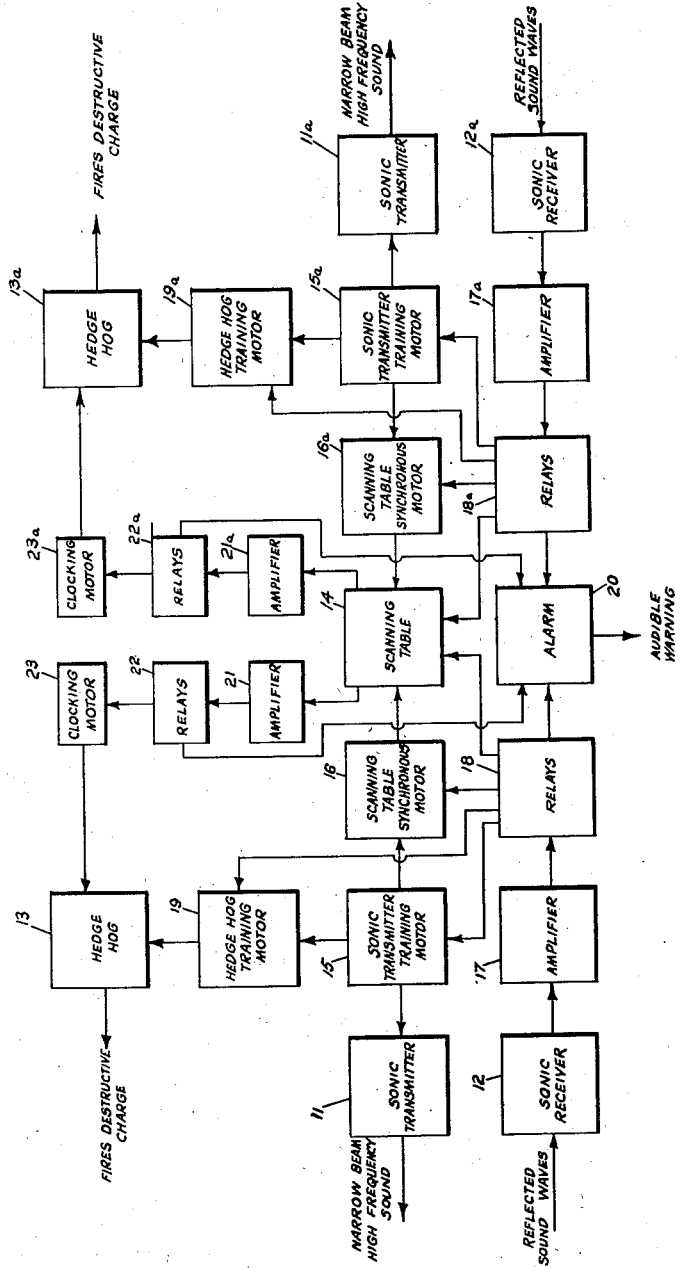

As shown in Figs. 1 and 2, sonic transmitters 11 and 11a are located at spaced points preferably near the ends of a ship 34 and optionally projecting below the hull of the ship. The transmitters are adapted to emit a relatively high-frequency sound beam having highly directional characteristics. The direction in which this sound beam is emitted is controlled by a sonic-transmitter training motor 15 or 15a which, in turn, is synchronized with a scanning-table synchronous motor 16 or 16a. In the course of normal operation, the sonic transmitters are each constantly rotating about respective vertical axes thereby emitting constantly rotating narrow beams of high-frequency sound vibrations.

Sonic receivers 12 and 12a are mounted for conjoint rotation with the transmitters 11, 11a, respectively. The receivers are tuned respectively to the frequencies of the sonic transmitters 11 and 11a and are suitably adapted to detect any reflection of the sonic waves emitted by the transmitters.

The scanning table 14 may be located at any convenient part of the ship and connected to the receiving apparatus by suitable transmission lines.

An impulse detected by one of these receivers is passed to an amplifier 17 or 17a whereby the impulse is amplified to provide a sufficiently powerful electrical impulse to operate a series of relays 18 or 18a.

Coacting with the sonic transmitters 11 and 11a are a pair of destructive charge projectors or hedge hogs 13 and 13a, which in the course of normal operation, are constantly rotating at the same speed as the sonic transmitters. Optionally these destructive-charge projectors are located at a point on the same vertical axis with the sonic transmitters 11 and 11a although for all practical purposes this is not strictly necessary. These destructive-charge projectors comprise generally Y-shaped guns that are adapted to project a group of depth charges in a prearranged pattern in the direction in which they are aimed.

Controlling the direction of these destructive charge projectors are a pair of training motors 19 and 19a which are synchronized with sonic-transmitter training motors 15 and 15a by conventional means. Thus the depth charges or other destructive charges are constantly poised to be fired in the direction of the narrow beams of high-frequency sonic waves.

The previously mentioned relays 18 and 18a are conventional relays operating in accordance with conventional wiring diagrams to accomplish the following purposes: When a reflected sonic wave is detected by the sonic receiver 12 or 12a and amplified in amplifier 17 or 17a, relays 18 or 18a are operated to interrupt the sonic-transmitter training motor 15 or 15a, eventually to train the sonic transmitter 11 or 11a constantly on whatever underwater objects cause the reflection of the sound waves. Simultaneously with this the relays 18 or 18a operate to activate the scanning-table synchronous motor 16 or 16a and to activate the scanning table 14; and also simultaneously the relays 18 or 18a may optionally sound an alarm system 20 to give an audible warning of the detection of an underwater object.

Once activated by relay 18 or 18a the scanning table 14, by means hereinafter to be described, operates to maintain a constant record of the direction in which sonic transmitters 11 and 11a are aimed thereby using the principles of triangulation to maintain a constant record of the position of the detected underwater object. By means of controls hereinafter to be described, electrical impulses intensified by amplifiers 21 or 21a activate relays 22 or 22a which in turn operate clocking motors 23 or 23a to control the firing of the destructive-charge projectors 13 or 13a. Relays 22 or 22a may also optionally operate an alarm system 20 to give audible warning of the approach of the detected underwater object within a predetermined distance from the ship. The structure and operation of the various equipment described in general in connection with Fig. 1 are shown in greater detail in Figs. 2 to 7 and are described in connection therewith.

Fig. 2 shows a ship 34 equipped with an after sonic transmitter 11 and a forward sonic transmitter 11a. In the normal operation these transmitters are rotated at a predetermined rate, for example, five revolutions per minute, constantly searching the surrounding water. When an object is spotted, the beams of sound are automatically focussed or trained thereon by means to be explained hereinafter. The beams 35 and 36 of these transmitters are shown trained on an underwater object 37 located at a distance from the ship, the angles 25 and 26 between said beams 35 and 36 and the center line 24 of the ship 34 indicating the distance and direction from the ship 25 to said underwater object 37.

In Fig. 3 there is shown a schematic diagram of the scanning table 14 which is used to indicate the location of the detected object and which is a controlling unit for the points surrounding the ship 34.

Light beams 38 and 39 from suitably rotatable sources of light 40, 41, respectively, are shown in Fig. 3 as converging or focussed on one photoelectric cell 44 in a barrier or array of photoelectric cells 42. The beams 38, 39 are also incident on photoelectric cells 45 and 46 arrayed in a second barrier 43 of photoelectric cells. The energy caused by the impact of one light beam on a photoelectric cell, as in the case of cell 45 or cell 46, is insufficient to create any effect upon the various electrical relays in the apparatus; however, the energy caused by the impact of both light beams on the cell 44 when amplified in amplifier 21 or 21a (Fig. 4) is sufficient to energize relays 22 and 22a as will be described hereinafter.

Since the beams 38, 39 are produced by sources 40, 41, respectively, which sources, in turn, are synchronously movable with transmitters 11, 11a and receivers 12, 12a, respectively, it will be clear that the beams 38, 39 are always directed in the same senses as the respective sound beams 36, 35. Thus, when the sound beams 36, 35 are trained on the target 37, the light beams 38, 39 are convergent and intersect at a point corresponding to the instant location of the target relative the transmitters 11, 11a. If the instant location of the target is in a region represented by the array 42 of photoelectric cells, the intersection of the light beams 38, 39 occurs at one of the cells, say cell 44, of the array 42.

As the position of the target changes, the points of convergence of the sound beams 36, 35 and the light beams 38, 39 change accordingly. For positional changes within the region represented by array 42, different ones of the photoelectric cells 44 in array 42 are successively activated by the convergence of the light beams 38 and 39. For positional changes from the region represented by array 42 to the region represented by array 43, the point of convergence of light beams 38 and 39 occurs on a photoelectric cell in array 43. Thus, the movement of the target toward or away from the craft is accompanied by shifting of the point of convergence of light beams 38, 39 from array 42 to array 43 or conversely.

It is thus apparent that the movement of the point of convergence of the light beams 38, 39 corresponds to and indicates the movement of the target relative the craft 34.

By measurement of the time elapsing between the activation of a photoelectric cell in array 42 and the activation of a cell in array 43, the relative speed of approach of the target can be determined.

Figure 4:
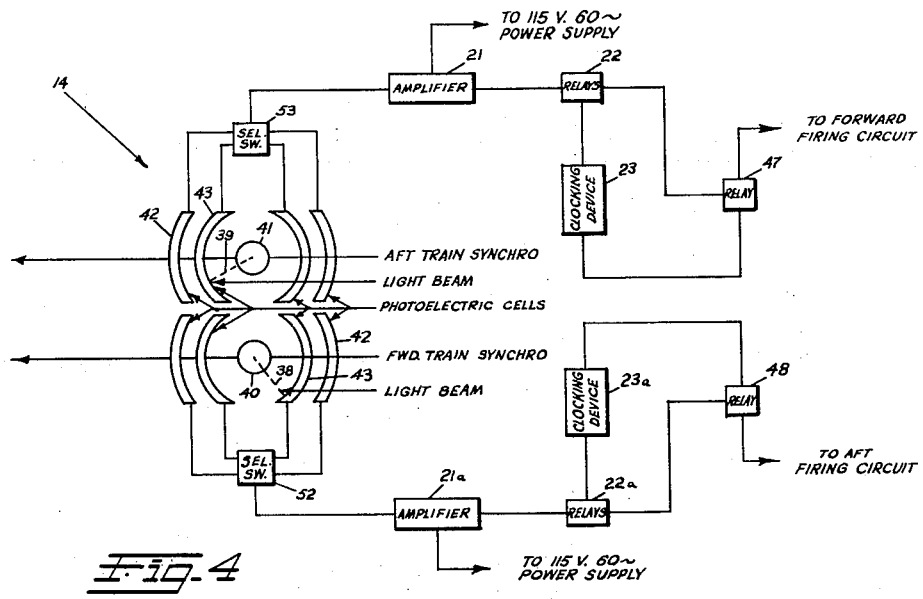
Fig. 4 is a diagram showing the automatic activation of apparatus for destroying a detected underwater object.

Fig. 4 shows diagrammatically the scanning table 14 and its connection through amplifiers 21 and 21a and relays 22 and 22a to the destruction equipment. The light beams 38 and 39 from the sources 40 and 41 are directed on the photoelectric cells on barriers 43 and 42, respectively. Thus, in the condition illustrated, the sound beams 35, 36 are not trained on a given target, and since the energization of a given photocell by light from a single beam only is insufficient to activate the cell, no photocell is activated and the system is in normal search activity. However, when the sound beams 35, 36 are trained on a target, as in Fig. 2, the light beams 39, 38 are convergent, and if the target is instantly located in the region represented by array 42, as in Fig. 3, a single photocell is activated by the combined radiation of the convergent light beams 39, 38.

Upon the occurrence of such activation of a photocell, say photocell 44 (Fig. 3) the electrical energy from said photoelectric cell is directed through one of the amplifiers 21 or 21a and thence to one of the relays 22 or 22a or to one of clocking devices 23 and 23a and to one of the relays 47 and 48 (shown in Fig. 1 as being part of relays 22 and 22a) which operate the appropriate firing circuit according as the activated photocell is in the array 42 for the forward or aft part of the craft. It is to be noted that the activation of a photoelectric cell in the forward half of the scanning table unit causes the activation and firing of the forward destruction unit, while energizing a photoelectric cell in the after half of the scanning table unit causes the activation and firing of the after destruction unit. By means of switches 52 and 53 either the port or starboard side of either the forward or after half of the scanning table may be manually cut out, if this should be desired.

Figure 5:
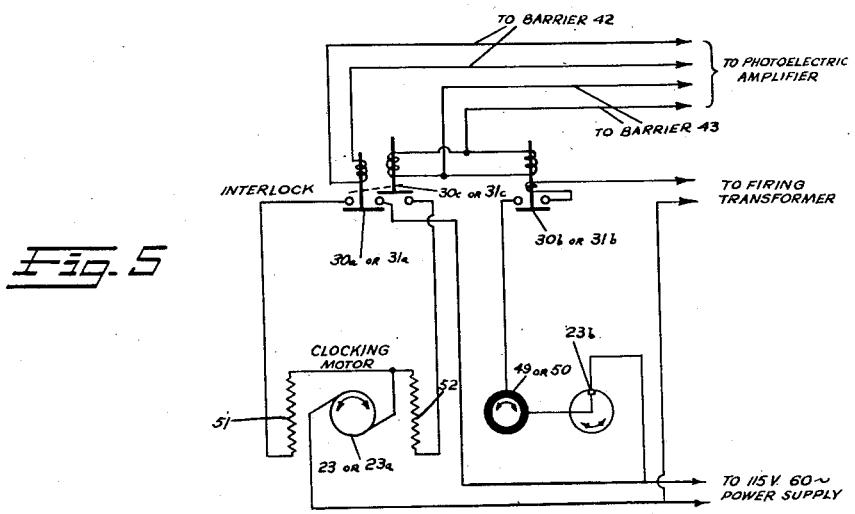
Fig. 5 is a more detailed wiring diagram showing the functioning of the activating equipment for the destructive apparatus.

Fig. 5 shows, in greater detail, the operation of the clocking motor and firing mechanism. An electrical impulse from the outer barrier 42 of photoelectric cells, created, for example, when the two beams 38 and 39 simultaneously impinge upon one cell in the outer barrier, and intensified by amplifier 21 or 21a, operates relay 22 or 22a which causes the clocking device 23 or 23a to begin turning. The turning of this clocking motor causes the firing contacts 23b to be moved apart thus preventing the firing operation. The activation of the inner barrier 43 of photoelectric cells by the simultaneous impingement of light beams 38 and 39 thereon causes relays 30b and 30c or 31b or 31c to be energized. The energizing of relay 30c or 31c causes the direction of rotation of the clocking motor to be reversed, thereby causing the firing contact points 23b again to be brought together. The energizing of relay 30b or 31b causes the activation of firing unit 49 or 50 with the result that the firing device operates when the firing contacts are brought together by clocking motor 23 or 23a. Resistances 51 and 52, in series with clocking motor 23 or 23a assist in regulating said motor and preventing burning out thereof.

Fig. 6 shows one embodiment of a method for automatically training a high-frequency sound transmitter on a detected object. According to this embodiment of the invention, each sonic transmitter assembly (11 or 11a in Fig. 1) consists of two narrow-beam transmitters 28 and 28a, so mounted as to project their sound beams in a slightly diverging path, each transmitter being provided with its own receiver 29 or 29a (shown for convenience in Fig. 6 as being part of transmitter 28 and 28a) tuned to its individual frequency. The electrical impulse generated by sound waves reflected from an underwater object and received in receiver 29 is amplified in amplifier 17 and operates relays 18. Similarly, the electrical impulse generated by reception of the reflected sound waves in receiver 29a is amplified in amplifier 17a and operates relay 18a. The energizing of relay 18 causes reversal of the training motor 15 through unit 15c which controls the direction of the sonic transmitters and also opens relay 18a. Thus, alternately energizing relays 18 and 18a, causes the sonic transmitter to be trained on the detected object.

Fig. 7 is a wiring diagram of a control unit, incorporating the apparatus represented in Fig. 1 by the relays 18 and 18a. These relays receive the amplified impulse from the sonic receiver, and activate various of the equipment in the apparatus as described in connection with Fig. 1, and as will be described hereinafter. In addition to this activation, the unit 18 or 18a also causes the sonic transmitter training motor 15 or 15a to be reversed and adjusts the time of the reversal relative to the range of the target object so that at the end of the reverse movement or backtracking of the transmitter 11 or 11a, the latter is trained substantially toward the detected object 37. Conventional electrical symbols are used throughout this figure, and the equipment used is standard electrical equipment the operation of which does not require a specific description of individual articles. The elements of Fig. 7 are most conveniently described in connection with the operation thereof, as set forth below.

The operation of the unit is as follows:

Upon receipt of a sound impulse in the receiving units and its conversion into an electrical impulse which is subsequently amplified and passed through conductor 69a to condenser 69 and resistance 70, relay 71 is energized thus operating an automatic alarm system, activating the scanning table, activating the synchronous destruction-charge-projector training motors and activating the transmitter training apparatus described in Fig. 6, all by means of conventional electrical equipment which is not specifically included in the wiring diagram of the control unit itself.

Upon receipt of the sound echo from the object at maximum range, the output of the amplifier is capable of closing only relay 71 which performs the hereinbefore described operations. As the range of the object decreases, the strength of the echo signal increases and the output of the amplifier augmented to a value capable of closing relays 72, 73, 74 and 75. The energizing of these relays successively shorts out portions of resistor 77. When relays 72, 73, 74 and 75 are energized, the condenser 78 charges through resistors 77 and 79. The charging voltage is the drop across relay 76 and resistor 80 but at the instant the relay makes contact, the condenser 78 charging current is maximum. The grid bias of the tube 84 is then equal to the drop across the relay 76 and resistor 80 circuit minus the drop across resistors 77 and 79. As the charging of the condenser 78 proceeds, the current through 77 and 79 decreases resulting in an increase in the negative grid bias. When the condenser is fully charged, the grid bias is again approximately equal to the drop across the relay 76 and resistor 80 circuit. Therefore, when this circuit is closed by relay 73, the plate current rises to close relay 76 and then falls to open this relay when the grid condenser has charged sufficiently. The values of the resistors 77 and 79 determine the operational time factor of relay 76. Various values of resistance 77 will control the time period that relay 76 will be sufficiently energized to close and thus actuate relay 81, the sonic transmitter control relay.

With relay 81 in its normal position, as shown, the power input of the direction control motor for the sonic transmitter is limited by resistor 82 thus causing the operation of said motor at its relatively slow searching speed. When relay 81 is energized by the operation relay 76, switch 83 is reversed, and thus resistor 82 is removed from the circuit, increasing the electrical input to said motor, and the polarity of the input is reversed. This causes said motor to reverse its direction and to increase its speed thus shortening the time consumed by the backtracking.

The thus produced variations in time and speed of backtracking are adjusted to make provision for the varying time for reception of a sound echo depending on the distance from the object which is detected.

This invention has thus provided apparatus for the automatic detection and destruction of an underwater object such as, for example, a torpedo. During a period of "rest" when no underwater object 37 has been detected, the sonic transmitters 11 and 11a are rotating at a predetermined rate, for example 5 R. P. M. When the torpedo 37 approaches within range of the apparatus, e. g., within 2 miles, the sonic waves are reflected back by the torpedo and are picked up by receiver 12 or 12a and converted into an electrical impulse. This impulse is amplified in amplifier 17, and operates relays 18, thus activating the apparatus, sounding an alarm, and causing backtracking of transmitter 11. Simultaneously light beam 38 in the scanning table 14 (as in Fig. 3) indicates the path of the sonic beam, the transmitter being automatically trained on the moving torpedo 37 by relays and motors as shown in Fig. 6. Similarly, the other transmitter 11a and cooperating light beam 39 have been simultaneously trained on the torpedo 37, and its position is thereby established. When the correct range is obtained, destructive-charge projector 13 is fired, automatically placing a destructive charge in the path of the torpedo. The entire procedure has thus been carried out without the intervention of any human agency with its consequent danger of failure.

It is within the ability of one skilled in the art to provide on the destructive-charge projector or on the training motor thereof suitable means for adjusting its aim, to allow it to "lead" a rapidly moving object and project the destructive charges in the path taken by said object and sufficiently in front of said object. Other similar adjustments on various parts of the apparatus will be obvious to those skilled in the art.

Numerous variations, of course, will be within the scope of this invention and numerous adaptations of this invention may be made by omitting or modifying various features thereof. In addition, the apparatus for the destruction of the underwater object may be eliminated, thus removing the necessity for a part of the complex electrical equipment described herein. Thus, for example, a single barrier of photoelectric cells operating a conventional alarm system upon the focusing of two beams on one cell will afford sufficient warning of underwater objects for all merchant and passenger vessels in peacetime operation, and accordingly, the destruction apparatus and the additional barriers of photoelectric cells may be completely eliminated. The thus simplified apparatus for the mere detection of underwater objects comprises a plurality of high frequency sound transmitters and receivers tuned thereto, and the scanning table containing a single barrier of photoelectric cells, which operate an alarm system and provide means for determining the position of said object.

In peacetime, the herein described equipment may be used as a highly efficient navigational aid, detecting such objects as icebergs, submerged reefs, other ships, underwater navigational landmarks and the like. During wartime, the apparatus optionally including the destruction equipment herein described will serve the additional purposes of detecting enemy craft, such as submarines, and detecting and destroying torpedoes, mines, and the like.

In general it may be said that the operation of this invention is independent of weather and atmosphere conditions and is completely automatic, thereby eliminating the human factor.

Modifications and changes can be made in this invention without departing from the spirit and scope thereof as set forth in the appended claims.

The invention described herein may be manufactured and used by or for the Government of the United States of America for governmental purposes without the payment of any royalties thereon or therefore.

What is claimed is:

1. Apparatus for the detection of underwater objects comprising a plurality of narrow-beam high-frequency sonic transmitters located at spaced points, said transmitters being adapted to be rotated at a predetermined rate around vertical axes, means energizing said transmitters continuously to emit sonic waves of respectively characteristic frequencies, sonic receivers tuned respectively to said transmitters and adapted to receive energy of said waves after reflection thereof from an object having a relative motion with respect to said apparatus, means responsive to the reflection of said beams from said object for reversing and adjusting the rate of reverse rotation of said transmitters according to the instant distance to said object, and indicating means also responsive to said reflection for showing the directions in which said transmitters emit said sonic beams.

2. Apparatus for the automatic detection and destruction of underwater objects comprising a plurality of narrow-beam high-frequency sonic transmitters located at spaced points, means rotating said transmitters at a predetermined rate around vertical axes, said transmitters including means for radiating sonic waves of respectively characteristic frequencies, sonic receivers tuned respectively to said transmitters and adapted to receive part of said waves after the reflection of said sonic waves from a remote object, means for reversing and adjusting the rate of rotation of said transmitters automatically upon detection of a reflected sonic wave, means generating a plurality of beams of light, said light beams being movable in paths corresponding to the movement of said sonic waves, whereby said beams of light are orientatable in directions corresponding to the direction of the transmission of said sonic beams, a plurality of photoelectric cells surrounding said sources of light beams and positioned and arranged to receive said light, relays means adapted to be energized by a signal from said photoelectric cells, and explosive-charge-projecting means connected to said relays for projecting an explosive charge in substantially the direction of the transmission of said sonic beams.

3. In apparatus for detecting an underwater object including means for generating and radiating a plurality of beams of sonic wave energy toward a target object and means for receiving a part of said energy after reflection from said object, the combination of means for indicating the position of said object comprising means for producing a plurality of narrow beams of light, means synchronized to the sonic beams for moving said light beams coordinately with the sonic beams, and at least one bank of photoelectric cells disposed to intercept said beams of light and generate an electrical impulse when two of said beams impinge simultaneously upon one of said photoelectric cells thereby to indicate an on-target condition of said apparatus, the angular relation of said light beams indicating the position of said object.

4. The combination as defined in claim 3, wherein the means for generating the plurality of beams of sonic wave energy, and the means for producing the plurality of beams of light each comprise spaced sources of the respective energies, the sources of light energy being spaced in predetermined ratio relative to the spacing of said sources of sonic energy.

5. In an object-detecting system of the character described, means for generating wave energy of a predetermined frequency value, means for transmitting said wave energy as a scanning beam, means for receiving a portion of the energy of said beam after reflection from an object having a distance to said system changing with time, and means responsive to the received energy for reversing the direction of scan of said beam, said last-named means including circuit means varying the speed of the reverse scan in accordance with variations of the distance of said object from said system.

6. In an object-detecting system of the character described, means for generating ultrasonic waves of a plurality of frequencies, means for transmitting said waves as a plurality of scanning beams of ultrasonic energy, means for receiving a portion of the energy of said beams after reflection from an object having a distance to said system changing with time, and means responsive to the received energy for reversing the direction of scan of said plurality of beams, said last-named means including a circuit having means for controlling the speed of the reverse scan in accordance with the instant distance of said object from said system.

7. In an object-detecting system of the character described, means for generating ultrasonic waves of a plurality of frequencies, means for transmitting said waves as a plurality of scanning beams of ultransonic energy, means for receiving a portion of the energy of said beams after reflection from an object having a distance to said system changing with time, and means responsive to the received energy for reversing the direction of scan of said plurality of beams, said last-named means including a multiple-relay delay-circuit arrangement comprising a plurality of relays having unequal response characteristics, an R-C network, means connecting said relays to the resistor of said network to alter the effective value thereof in accordance with the instant distance of said object from said system thereby to alter the time constant of said network, and means responsive to the altered value of said time constant for controlling the speed of the reverse scan.

8. In an object-detecting and locating system of the character described, means for generating ultrasonic waves of a plurality of frequencies and for transmitting said waves as a plurality of scanning beams of ultrasonic energy, means for receiving a portion of the energy of said beams after reflection from an object having a distance to said system changing with time, indicating means for continuously representing the position of said object relative to the system, and means responsive to the received energy actuating said indicating means and for reversing the direction of scan of said plurality of beams, said last-named means including a delay circuit having means for controlling the speed of the reverse scan in accordance with the instant distance of said object from said system.

9. An object detecting and location system comprising means for generating ultrasonic-frequency energy; means for radiating said energy as a pair of directional beams and for scanning the space therewith; means for receiving a portion of the energy after reflection from a remote target having a relative motion with respect to the system; and means for continuously indicating the position of said target relative to said system, said indicating means comprising a plurality of photosensitive elements arrayed in a predetermined pattern, means for providing a pair of pencils of light energy adapted to be moved in synchronism with said directional beams, thereby normally to irradiate individual elements of said indicating means, and means responsive to irradiation of a single element by both said pencils of light for determining the location of said target.

10. An object detection and location system comprising means for generating and radiating wave energy as a plurality of directional beams and for scanning the space therewith; means for receiving a portion of the energy after reflection from a remote target having a relative motion with respect to the system; and means for continuously indicating the position of said target relative to said system, said indicating means comprising a plurality of photosensitive elements arrayed in a predetermined pattern, means for providing a plurality of pencils of light energy adapted to be moved in synchronism with said directional beams, thereby normally to irradiate individual elements of said indicating means, and means responsive to irradiation of a single element by both said pencils of light for determining the location of said target.

11. In a system of the character described, the combination comprising means for generating ultrasonic-frequency energy; means for radiating said energy as a pair of independently movable directional beams and for scanning the space therewith; means for receiving a portion of the energy after reflection from a remote target having a relative motion with respect to the system; and means for continuously indicating the position of said target relative to said system, said indicating means comprising a plurality of photoelectric cells arrayed in a predetermined pattern, means for providing a pair of pencils of light energy adapted to be moved in synchronism with said directional beams, thereby normally to irradiate individual elements of said indicating means, and means responsive to irradiation of a single photoelectric cell by both said pencils of light for determining the location of said target.

12. The combination as defined in claim 11 wherein said photoelectric cells are arcuately arranged in a plurality of barriers, the combination further comprising an audibile alarm, means for launching a destructive missile, and further means responsive to the conjoint irradiation of a single photoelectric cell by both said pencils for simultaneously actuating said alarm and said missile-launching means.

13. An automatic fire-control apparatus comprising, in combination, means for generating and radiating wave energy as a plurality of directional beams and for scanning the space therewith; means for receiving a portion of the energy after reflection from a remote target having a relative motion with respect to the system; and missile-launching means mounted for scanning movement with said beams, and means for continuously indicating the position of said target relative to said system, said indicating means comprising a plurality of photosensitive elements arrayed in a predetermined pattern, means for providing a pair of pencils of light energy adapted to be moved in synchronism with said directional beams, thereby normally to irradiate individual elements of said indicating means, and means responsive to irradiation of said elements by both said pencils of light for determining the location of said target and for simultaneously actuating said missile-launching means to discharge an explosive missile toward the target.

GEORGE C. EVANS.

REFERENCES CITED

The following references are of record in the file of this patent:

UNITED STATES PATENTS

| Number | Name | Date |
|---|---|---|
| 1,172,306 | Parker et al. | Feb. 22, 1916 |
| 1,409,794 | Spitz | Mar. 14, 1922 |

(Other references on following page)

UNITED STATES PATENTS

| Number | Name | Date |
|---|---|---|
| 1,471,547 | Chilowsky et al. | Oct. 23, 1923 |
| 1,747,664 | Droitcour | Feb. 18, 1930 |
| 1,973,673 | Rice | Sept. 11, 1934 |
| 2,240,800 | Rigert | May 6, 1941 |
| 2,368,953 | Walsh | Feb. 6, 1945 |
| 2,405,694 | Herzmark | Aug. 13, 1946 |
| 2,409,462 | Zworykin et al. | Oct. 15, 1946 |
| 2,422,333 | Bedford | June 17, 1947 |

FOREIGN PATENTS

| Number | Country | Date |
|---|---|---|
| 764,537 | France | Mar. 5, 1934 |
| 455,765 | Great Britain | Oct. 27, 1936 |
| 546,202 | Great Britain | July 2, 1942 |
| 548,550 | Great Britain | Oct. 14, 1942 |
| 555,052 | Great Britain | Aug. 3, 1943 |